(12) United States Patent
Machida et al.

(10) Patent No.: US 8,001,094 B2
(45) Date of Patent: Aug. 16, 2011

(54) SYSTEM, METHOD, PROGRAM, AND SYSTEM IMPLEMENTATION METHOD FOR TRANSACTION PROCESS LOGGING

(75) Inventors: Takeo Machida, Ichikawa (JP); Kohhei Nomura, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/159,024

(22) PCT Filed: Dec. 19, 2006

(86) PCT No.: PCT/JP2006/325274
§ 371 (c)(1),
(2), (4) Date: Jun. 24, 2008

(87) PCT Pub. No.: WO2007/074680
PCT Pub. Date: Jul. 5, 2007

(65) Prior Publication Data
US 2009/0204645 A1 Aug. 13, 2009

(30) Foreign Application Priority Data

Dec. 26, 2005 (JP) ................................. 2005-372866

(51) Int. Cl.
*G06F 7/00* (2006.01)
*G06F 17/00* (2006.01)
(52) U.S. Cl. ..................................................... 707/694
(58) Field of Classification Search .................. None
See application file for complete search history.

(56) References Cited

U.S. PATENT DOCUMENTS

2003/0028753 A1 2/2003 Ohishi

FOREIGN PATENT DOCUMENTS

| JP | 9244998 | 9/1997 |
|---|---|---|
| JP | 2001-350640 | 12/2001 |
| JP | 2003141076 | 5/2003 |
| JP | 2003178285 | 6/2003 |
| JP | 2005-89051 | 4/2005 |

(Continued)

OTHER PUBLICATIONS

Piccinelli, "Service Provision and Composition in Virtual Business Communities", HPL-1999-84, 1999, Hewlett Packard.*

(Continued)

*Primary Examiner* — Michael Hicks
(74) *Attorney, Agent, or Firm* — Douglas Lashmit; Hoffman Warnick LLC

(57) ABSTRACT

A system is provided to log a transaction process performed based on a service level agreement concerning the response time of the transaction process. The system includes a logging policy table, a transaction process monitoring unit, and a storage device. The logging policy table records one or more logging policies defined to log a transaction process with a varying amount of log data based on a required response time specified in the service level agreement. The transaction process monitoring unit automatically monitors the response time of the transaction process. The storage device records a transaction process log. The system further includes a logging control unit. The logging control unit uses response time of a transaction process monitored by the transaction process monitoring unit to select one of the logging policies stored in the logging policy table. According to the selected logging policy, the logging control unit allows the storage device to record a log of the transaction process.

20 Claims, 8 Drawing Sheets

FOREIGN PATENT DOCUMENTS

| | | |
|---|---|---|
| JP | 2005-92885 | 4/2005 |
| JP | 2005165108 | 6/2005 |
| JP | 2005242988 | 9/2005 |
| JP | 2005267036 | 9/2005 |
| JP | 2005302057 | 10/2005 |
| WO | WO 2007074680 A1 | 7/2007 |

OTHER PUBLICATIONS

PCT, Written Opinion of the International Searching Authority, International Application No. PCT/JP2006/325274, International Filing Date, Dec. 19, 2006.

Hayato Ishibashi, "syslog/syslog-ng ni yoru seigyo", Open Source Magazine, Softbank Publishing Corp., Aug. 20, 2005, vol. 2, pp. 78-85.

Kunihiro Tanaka, Server Unyo no Zentei Chishiki. Tune-up Web System No. 3, Linux World, IDG Japan, Inc., Oct. 1, 2001, vol. 5, No. 10, pp. 138-142.

Yosuke Kimura, Performance no Takai Database wo Donyu Shiyou: SQL Server 2000 Unyo Kanri Master Kouza, Windows 2000 World, IDG Japan, Inc., May 1, 2003, vol. 8, No. 5, pp. 146-151.

* cited by examiner

FIG. 3

```
<loggingPolicies>
    <loggingPolicy trx="tran1,tran2">                              ─310
        <threshold respTime="300" numOfInstance="20" />
            <action logLevel="WARN" dump="on" />
        </threshold>
    </ loggingPolicy >
    < loggingPolicy trx="tran3">                                    ─320
        <threshold respTime="5000" numOfIncetance="100" />
            <action logLevel="DEBUG" dump="on" />
        </threshold>
    </ loggingPolicy >
</ loggingPolicies>
```

```
<transactions>
    <transaction name="tran1" >                                     ─410
        <param name="TrxID" value="Trx0001" />
        <param name="UserGroup" value="GOLD" />
    </transaction >
    <transaction name="tran2" >                                     ─420
        <param name="TrxiD" value="Trx0002" />
        <param name="UserGroup" value="GOLD" />
    </transaction >
    <transaction name="tran3" >                                     ─430
        <param name="URI" value="*/EMPSearch.do" />
    </transaction >
</transactions >
```

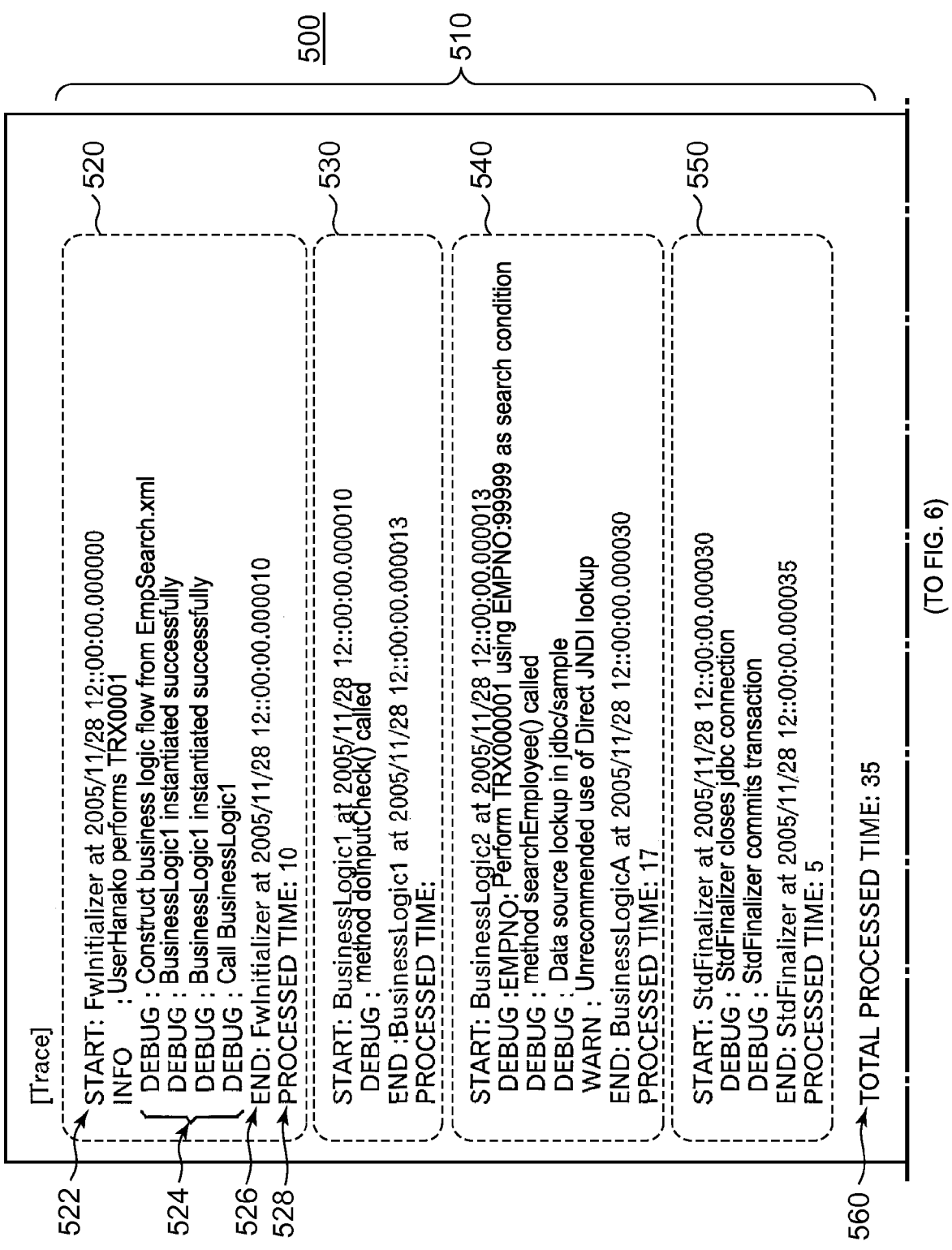

[Trace]
START: FwInitializer at 2005/11/28 12::00:00.000000
INFO    : UserHanako performs TRX0001
DEBUG : Construct business logic flow from EmpSearch.xml
DEBUG : BusinessLogic1 instantiated successfully
DEBUG : BusinessLogic1 instantiated successfully
DEBUG : Call BusinessLogic1
END: FwInitializer at 2005/11/28 12::00:00.000010
PROCESSED TIME: 10

START: BusinessLogic1 at 2005/11/28 12::00:00.000010
DEBUG ; method doInputCheck() called
END :BusinessLogic1 at 2005/11/28 12::00:00.000013
PROCESSED TIME:

START: BusinessLogic2 at 2005/11/28 12::00:00.000013
DEBUG :EMPNO: Perform TRX000001 using EMPNO:99999 as search condition
DEBUG : method searchEmployee() called
DEBUG : Data source lockup in jdbc/sample
WARN : Unrecommended use of Direct JNDI lookup
END: BusinessLogicA at 2005/11/28 12::00:00.000030
PROCESSED TIME: 17

START: StdFinalizer at 2005/11/28 12::00:00.000030
DEBUG : StdFinalizer closes jdbc connection
DEBUG : StdFinalizer commits transaction
END: StdFinalizer at 2005/11/28 12::00:00.000035
PROCESSED TIME: 5
TOTAL PROCESSED TIME: 35

(FROM FIG. 5)

[BusinessLogic Dump]

```
BusinessLogic1@f18569f{
    result=true
    condition=com.ibm.ats.webfw.app.util.Employee@17a5c5e6
}
BusinessLogic2@f0b569f{
    list=com.ibm.ats.webfw.app.util.Employee@22a5c5e6
    condition=com.ibm.ats.webfw.app.util.Employee@17a5c5e6
    SQL=SELECT * FROM EMPLOYEE WHERE EMPNO='E41'
}
StdFinalizer@f0b569f{
}
```
— 580

[Folder Dump]

```
<ControlFolder=com.ibm.ats.webfw.app.util.Employee@17a5c5e6{
    Folder data:
        ThreadID:12345
        TRX_ID=TRX0001
        FLOW_XML=EmpSearch.html
        USER=com.ibm.ats.webfw.app.util.Employee@17a5c5e6{
            lastName=Suzuki
            firstName=Hanako
            empNo=99999
            Department=IT
        }
}
```
— 585

```
<ErrorFolder=com.ibm.ats.webfw.ErrorFolder@70d985f9>
    Folder data:
        FATALERR= (null)
```
— 587

```
<OutputFolder=com.ibm.ats.webfw.OutputFolder@4162c5f9>
    Folder data:
OUTPUT RESULT=com.ibm.ats.webfw.app.util.EmployeeList@22a5c5e6{
        com.ibm.ats.webfw.app.util.EmployeeList@17a5c5e6{
            bonus=600000
            salary=300000
            hireDate=1999/04/01
            workDept=E11
            lastName=Yamada
            firstName=Taro
            empNo=12345
        }
    }
```
— 590

```
<InputFolder=com.ibm.ats.webfw.InputFolder@17ed85e6>
    Folder data:
SEARCH CONDITION=com.ibm.ats.webfw.app.util.Employee@17a5c5e6{
        com.ibm.ats.webfw.app.util.EmployeeList@17a5c5e6{
            bonus=(null)
            salary=(null)
            hireDate=(null)
            workDept=E11
            lastName=(null)
            firstName=(null)
            empNo=(null)
        }
    }
```
— 595

570

500

SYSTEM, METHOD, PROGRAM, AND SYSTEM IMPLEMENTATION METHOD FOR TRANSACTION PROCESS LOGGING

FIELD OF THE INVENTION

The present invention generally relates to an information processing technology. More specifically, the invention relates to a system, a method, a program, and a system implementation method for transaction process logging.

BACKGROUND ART

A company or the like (hereafter referred to as a user) using an information system for business purposes may use an outsourcing service for information system-related business. The purpose is to supplement technical capabilities concerning the information system-related business, ensure the scalability, reduce costs, and avoid an investment risk. In many cases, the user concludes a service level agreement (SLA) with a service provider. The service level agreement defines the quality of services supplied from the service provider.

The service level agreement defines requirements for the quality of various types of services. The requirements include the response time of a transaction in an information system, minimum throughput of a communication line, and an upper bound for information system unavailability time. Accordingly, it is very important for an outsourcing service operation to monitor the actual service quality of the information processing system and verify whether or not a service level is satisfied. To monitor the actual service quality of the information processing system and analyze a problem, the service provider performs collecting of log data for a transaction process (hereinafter, referred to as "logging"), during a period to provide an outsourcing service.

Japanese Unexamined Patent Publication (Kokai) No. 2005-92885 discloses an example of such information processing system. The system embodied in Japanese Unexamined Patent Publication (Kokai) No. 2005-92885 records transaction data in the central logging database to determine a current service level. The system uses a service level parameter based on the prepared service level agreement between a customer and the service provider to determine whether or not the current service level violates the guaranteed service level. The system is implemented to specify a cause if the required service level is not satisfied.

As another related art, Japanese Unexamined Patent Publication (Kokai) No. 5-89051 discloses the following logging technology. The technology measures response information by initiating a transaction from a terminal connected to a host. The technology outputs a result to a log file on the terminal. When the log file exceeds a specified size, the technology transmits log file information to the host.

As yet another related art, Japanese Unexamined Patent Publication (Kokai) No. 2001-350640 discloses the following technology for monitoring transaction performance degradation. Transaction performance degradation monitoring means periodically collects transaction process situations to monitor the performance degradation. If the performance degradation is detected, a status flag is set to indicate the performance degradation.

The transaction process response time is especially important among service items supplied from the service provider. The IBM Tivoli Monitoring for Transaction Performance product (see, e.g., "IBM Tivoli Monitoring for Transaction Performance: Administrator's Guide", written by International Business Machines Corporation, issued in September 2004) provides the function to monitor the transaction process response time.

The system described in Japanese Unexamined Patent Publication (Kokai) No. 2005-92885 similarly collects transaction data irrespectively of transaction processes. When many items are to be logged, the system needs to process a large amount of transaction data. A system load increases accordingly and output processes concentrate on a storage device. This may delay the transaction process. Generally, an outsourcing service is provided for a long term (e.g., several years), causing a large amount of transaction data to be recorded. On the other hand, there may be a case of logging only a few items to decrease the amount of transaction data to be recorded. However, it may be difficult to acquire sufficient information needed to record the actual service quality and to analyze a problem.

The transaction process system performs many transaction processes. A log is recorded for each of these transaction processes. The contents of the log may vary with the response time of each transaction process. Specifically, it is highly possible that a problem occurs when the transaction process causes a long response time. That transaction necessitates many pieces of information to be recorded for later analysis of the problem. Conversely, a problem is not likely to occur when the transaction process causes a short response time. That transaction may necessitate minimal information to be recorded for later analysis of the possible problem.

SUMMARY OF THE INVENTION

Accordingly, the present invention provides a technique that dynamically changes the data amount of a log for a transaction process according to the response time of the transaction process based on logging policy. The logging policy determines which item should be logged. For example, the technique increases the data amount of log when the transaction process causes the long response time. The technique decreases the data amount of log when the transaction process causes the short response time.

It is therefore an object of the present invention to provide a system, a method, a program, and a system implementation method for transaction process logging capable of solving the above-mentioned problem.

A system for performing logging of a transaction process performed based on a service level agreement concerning a response time of a transaction process is provided. The system includes a logging policy table for recording one or more logging policies defined so as to perform logging of a transaction process with a varying amount of log data based on a required response time specified in the service level agreement, a transaction process monitoring unit for automatically monitoring the response time of the transaction process, and a storage device for recording a transaction process log. The system further includes a logging control unit for selecting one of the logging policies stored in the logging policy table based on the response time of the transaction process monitored by the transaction process monitoring unit and allowing the storage device to record a log of the transaction process in accordance with the selected logging policy. Preferably, the logging policy table records a logging policy for performing logging of a larger amount of data than that for a case where the response time of the transaction process is shorter than the required response time, if the response time of the transaction process is longer than the required response time.

The storage device may include a high-order storage and a low-order storage, and the logging control unit allows the low-order storage to record all or part of the log of the transaction process recorded in the high-order storage, according to the logging policy.

Also, the system may include a log analysis unit for extracting information needed for analyzing the system to perform a transaction process, based on the log recorded in the storage device. The log analysis unit can extract information needed for the analysis in consideration for a logging policy applied to each transaction process. The log analysis unit can transmit extracted information needed for the analysis to a user-operated client via a network.

While there has been described the overview of the invention as the system for performing logging of many transaction processes, the invention can be also understood as a method, and a program or a program product. For example, the program product can include a recording medium for storing the program or a medium for transmitting the program.

Further, the invention can be understood as a method for implementing a system for performing logging of a transaction process performed based on a service level agreement concerning a response time of a transaction process. The method includes the steps of: installing a transaction process monitoring program that automatically monitors a response time of a transaction process on the system, installing a logging control program that allows a storage device to record a log of the transaction process in accordance with a logging policy selected based on a transaction process response time on the system, and setting at least one logging policy defined so as to perform logging of a transaction process with a varying amount of log data based on a required response time specified in the service level agreement to a logging policy table. The method further includes the steps of setting a reference destination of a logging policy table used by the installed logging control program, and establishing connection between the installed transaction process monitoring program and the installed logging control program so as to receive a response time of each transaction process.

The method further includes the steps of presenting a log recorded in the storage device for providing information about revision of the service level agreement, changing the logging policy table based on a revised service level agreement, and setting the reference destination of the changed logging policy table used by the logging control program to the logging policy table.

By adopting these constitutions, it is possible to implement a system for performing logging of a transaction process performed based on a service level agreement, and even if the service level agreement is revised, the system can be correspondingly re-implemented.

The above-mentioned overview of the invention does not describe all the necessary features of the invention. It should be noted that a combination or a sub-combination of the constituent elements can be also considered the invention.

BRIEF DESCRIPTION OF THE DRAWINGS

The present invention will be described in further detail with reference to the accompanying drawings. Throughout the description of the embodiment, the same components are designated by the same reference numerals.

FIG. 3 shows an example of a logging policy table according to an embodiment of the invention.

FIG. 4 shows an example of a transaction table according to an embodiment of the invention.

FIG. 5 exemplifies the first half (log/trace information) of a full set of transaction process log according to an embodiment of the invention.

FIG. 6 exemplifies the last half (memory dump information) of a full set of transaction process log according to an embodiment of the invention.

DETAILED DESCRIPTION OF THE INVENTION

The invention is capable of many different modes. Interpretation of the invention should not be limited to the description contents of an embodiment. It should be noted that means for solving the problems according to the invention do not require all combinations of features described in the embodiment.

The following disclosure is mainly directed to a method and a system. It is clearly understood by those skilled in the art that the invention can be embodied as a program or a program product available on a computer. Accordingly, the invention can be embodied as hardware, software, or a combination of both. The program can be recorded on any computer-readable media such as a hard disk, CD-ROM, optical storage, and magnetic storage.

Figure 1:
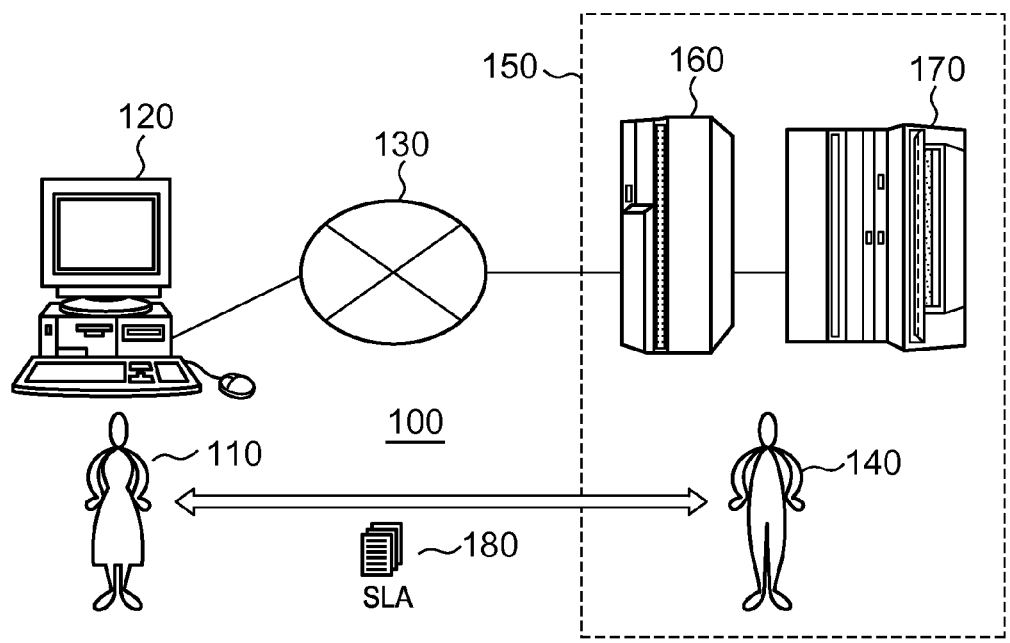
FIG. 1 is a conceptual diagram exemplifying an online system according to an embodiment of the invention.

FIG. 1 is a conceptual diagram showing an example of an online system 100 as an embodiment of the invention. The online system 100 includes a client computer 120 and a transaction process system 150. The client computer 120 is connected to the transaction process system 150 via a network 130. The transaction process system 150 is provided in an outsourcing center. Further, the transaction process system 150 includes an application server 160 and a database server 170.

A user 110 operates the client computer 120 to request a transaction process from the transaction process system 150. A service provider 140 operates and manages the transaction process system 150. The user 110 concludes a service level agreement 180 with the service provider 140

The client 120 is a terminal connectable to the known Internet. A person skilled in the art can easily implement the client 120. It is typical to connect the client 120 with the network 130 with mediation of an ISP (Internet Service Provider, not shown). The client 120 may constantly connect to the ISP using a leased line, LAN (Local Area Network), WAN (Wide Area Network), ADSL (Asymmetric Digital Subscriber Line), or FTTH (Fiber to the Home).

The network 130 is a communication path that connects the client 120 with the transaction process system 150. As an example, the Internet can implement the network 130. The network 130 provided as the Internet connects systems to each other using TCP/IP (Transmission Control Protocol/Internet Protocol). The network 130 uses IP addresses to specify systems that communicate with each other. An IP address is represented by a global address or a local address.

The application server 160 is a computer that provides services such as a transaction process in response to a request from the client 120. It should be noted that a person skilled in the art can appropriately implement such an application server 160 using the IBM WebSphere® Application Server (WAS) product provided by International Business Machines Corporation, the Microsoft IIS (Internet Information Server) product provided by Microsoft Corporation, the WebLogic Server product provided by BEA Systems, Inc., and the open source software products Apache and Apache Tomcat provided by Apache Software Foundation. To acquire data needed for the transaction process, the application server 160 also has a function to generate an SQL statement, i.e., a database query language, and issue a request to the database server 170.

The database server 170 stores data needed for the transaction process. The person skilled in the art can appropriately implement the database server 170 using existing relational database management systems (RDBMS) such as the IBM DB2® Universal Database product provided by International Business Machines Corporation, the Oracle Database® product provided by Oracle Corporation, and the Microsoft SQL Server® product provided by Microsoft Corporation. It should be noted that the person skilled in the art can appropriately implement the database server 170 using not only RDBMS, but also existing data management products including the hierarchical database management system such as the IBM Information Management System (IMS) product and the transaction management system such as the IBM Customer Information Control System (CICS) product provided by International Business Machines Corporation.

Figure 2:
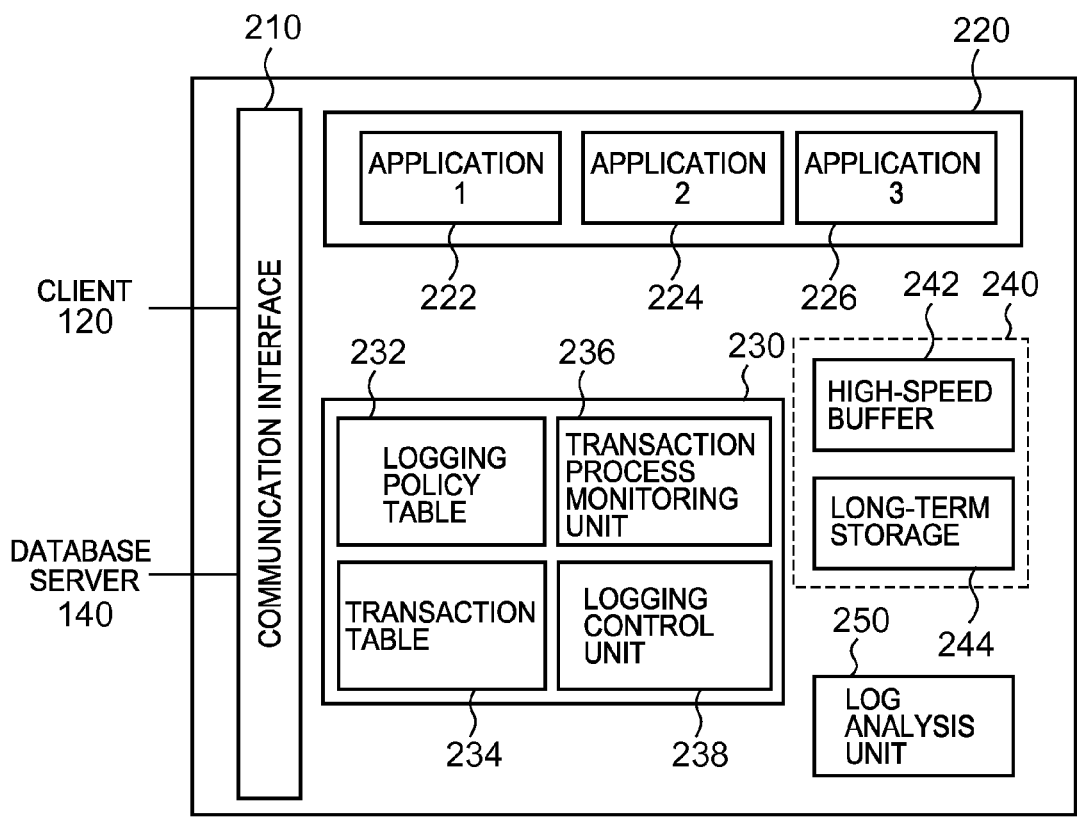
FIG. 2 is a functional block diagram of an application server according to an embodiment of the invention.
Figure 10:
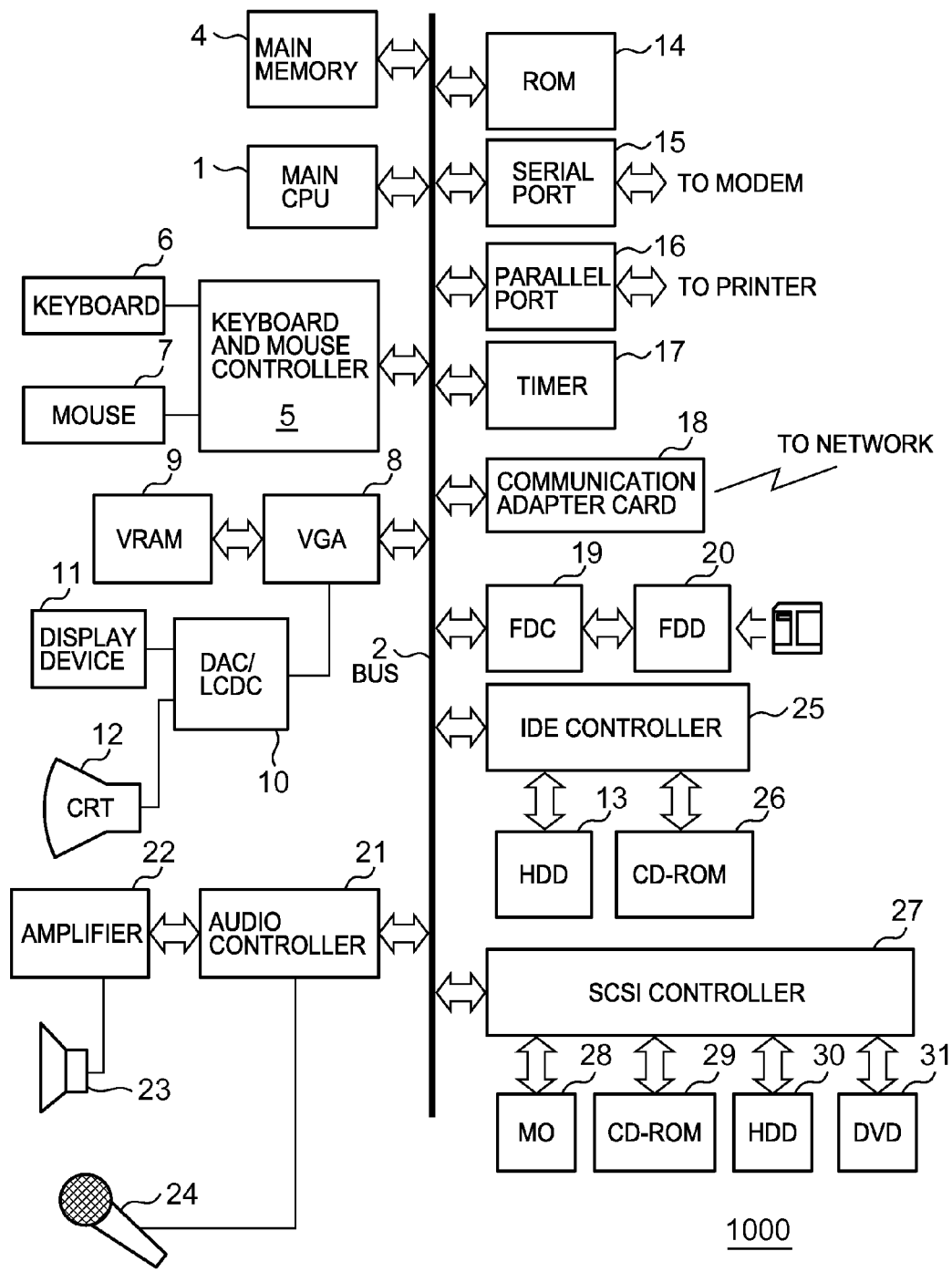
FIG. 10 exemplifies the hardware implementation of an information processing apparatus functioning as a client, an application server, and a database server according to an embodiment of the invention.

FIG. 2 is a functional block diagram of the application server 160 according to an embodiment. Components of the functional block diagram in FIG. 2 can be implemented on an information processing apparatus 1000 having a hardware implementation as shown in FIG. 10 (to be described) in cooperation with hardware resources and software. In this case, a hard disk device 13 or the like stores an operating system and computer programs that are loaded into main memory 4 and then are read into a CPU 1.

The application server 160 includes a communication interface 210, an application program storage unit 220, a logging system 230, a storage device 240, and a log analysis unit 250. The communication interface 210 has a function to receive a transaction process request from the client 120 via the network 130 and to return a transaction process result to the client 120 via the network 130. The communication interface 210 also has a function to request data needed for the transaction process from the database server 170 and to receive the data from the database 170.

According to an embodiment of the invention, the application program storage unit 220 includes three types of application programs 222 through 226. The application programs 222 through 226 perform different transaction processes in accordance with transaction process requests received from the client 120 via the communication interface 210. A transaction process request can be generated from a web browser of the client 120 and can be transmitted as an HTTP (Hyper-Text Transfer Protocol) to the network 130, but not limited thereto. Each of the application programs 222 through 226 has a function to allow the communication interface 210 to transmit an SQL request to the database server 170. The SQL request is issued for data needed for a transaction process.

The logging system 230 is a mechanism which allows the storage device 240 to store a log of transaction processes performed by the application programs 222 through 226. The logging system 230 includes a logging policy table 232, a transaction table 234, a transaction process monitor 236, and a logging controller 238.

The logging policy table 232 records logging policy in association with a condition of applying the logging policy (hereafter referred to as a policy application condition). The logging policy defines logging for more items than normal. The policy application condition is defined based on a required response time specified in the service level agreement 180. The policy application condition can be defined based on not only the response time of the transaction process, but also any one or combination of: the type of an application to perform the transaction process; the ID of a client that requested the transaction process; and the ID of a client group containing the client that requested the transaction process. The logging policy table can record or defines, as output log contents, which data item on the transaction process among data items including any one or combination of input data, output data, intermediate data, and error message for the transaction process.

FIG. 3 shows an example of the logging policy table 232 according to an embodiment of the invention. The logging policy table 232 in FIG. 3 defines a first policy 310 and a second policy 320. It is assumed that the service level agreement 180 according to an embodiment of the invention contains the following two service quality requirements:
1. Let us suppose that a specially authorized user (hereafter referred to as a user belonging to a gold group) requests a transaction process that uses the application program 222 or 224. In this case, the response time for the transaction process is assumed to be within 0.3 seconds.
2. Let us suppose that a user independent of any specific authority requests a transaction process that uses the application program 226. In this case, the response time for the transaction process is assumed to be within five seconds.

The first policy 310 is used for the first service quality requirement. The first policy 310 targets transaction processes (trx="tran1,tran2") belonging to a first transaction group (tran1) and a second transaction group (tran2). The first transaction group uses the application program 222 requested by a user belonging to the gold group. The second transaction group uses the application program 224. As will be described later, the transaction table 234 defines the first and second transaction groups. The first policy 310 is applied on condition that the response time of 0.3 seconds or more is required for the transaction process monitored by the transaction process monitoring unit 236 (respTime="300": milliseconds).

When the first policy 310 is applied, the system outputs log/trace information about the transaction process at a "WARN" (warning) level (logLevel="WARN"). The "WARN" level outputs reference information ("INFO") and warning information ("WARN") as the log/trace information. When the first policy 310 is applied, the system also records memory dump information as a log(dump="on"). The first policy is defined to be executed up to 20 times (numOfinstance="20"). When the execution count exceeds 20, the system outputs a log at an "INFO" (information) level. No memory dump information is output. The "INFO" level outputs only reference information ("INFO") as the log/trace information.

The second policy 320 is used for the second service quality requirement. The second policy 320 targets transaction processes (trx="tran3") belonging to a third transaction group (tran3) that uses the application program 226. As will be described later, the transaction table 234 defines the third transaction group (tran3). The second policy 320 is applied on condition that the response time of five seconds or more is required for the transaction process monitored by the transaction process monitoring unit 236 (respTime="5000": milliseconds).

When the second policy 320 is applied, the system outputs log/trace information about the transaction process at a "DEBUG" level (logLevel="DEBUG"). The "DEBUG" (debug) level outputs the log/trace information containing debug information ("DEBUG") in addition to the reference information ("INFO") and the warning information ("WARN"). When the second policy 320 is applied, the system records also the memory dump information as a log(dump="on"). The first policy is defined to be executed up to 100 times (numOfInstance="100"). When the execution count exceeds 100, the system outputs a log at an "INFO" level. No memory dump information is output. The "INFO" level outputs only reference information ("INFO") as the log/trace information.

According to an embodiment of the invention, the transaction table 234 defines a range of the transaction to be logged. Specifically, the transaction table 234 defines a range of the transaction to be logged using any of parameters contained in a transaction process request. These parameters include a URI, a query string for the GET method, form data for the POST process, header information in a SOAP message, a message received by Message Driven Bean, i.e., one type of EJB (Enterprise Java Bean), and a message listener, i.e., a feature for Message Driven Bean to receive a message. FIG. 4 shows an example of the transaction table 234. As shown in FIG. 4, the transaction table 234 according to an embodiment of the invention defines a first transaction group 410, a second transaction group 420, and a third transaction group 430.

The first transaction group 410 is defined to have transaction ID "Trx0001" and group ID "GOLD". The transaction ID is an identifier for selecting an application that is executed for the transaction process. The group ID specifies the group to which a user requesting the transaction process belongs. The second transaction group 420 is defined to have transaction ID "Trx0002" and group ID "GOLD". One embodiment of the invention assumes the following. Transaction IDs "Trx0001" and "Trx0002" are assigned to transactions using the application programs 222 and 224, respectively. Group identifier "GOLD" is assigned to a user who belongs to the gold group.

The third transaction group 430 is defined to have "/EMPSearch.do" at the end of a character string representing the URI (Uniform Resource Identifier) contained in the HTTP request for the transaction process. An example URI is "http://www.ibm.com/transaction/applications/EMPSearch.do" contained in the HTTP request from the client 110. One embodiment of the invention assumes that a URI is specified in this manner to request the transaction process using the application program 226.

Separation of the logging policy table 232 and the transaction table 234 can improve maintainability of the logging policy. For example, let us suppose that multiple transaction groups are mapped to one logging policy. In this case, the logging policy table 232 and the transaction table 234 are provided independently. Simply changing reference to the transaction table 234 from the logging policy table 232 can easily change the logging policy applied to a specific transaction group.

There may be a case where the transaction process satisfies none of the logging policy application conditions defined in the logging policy table 232. In such a case, the logging is performed according to the method specified at initiation of the application program that executes the corresponding transaction process. In such a case, for example, the embodiment of the invention outputs the log/trace information at the "INFO" level and outputs no memory dump information. The "INFO" level outputs only the reference information ("INFO") as the log/trace information.

The transaction process monitoring unit 236 can automatically measure at least the response time of the transaction process, but is not limited thereto. For example, a person skilled in the art can use the IBM Tivoli Monitoring for Transaction Performance product for the same purpose. Further, the person skilled in the art can create a program that records the beginning time and the ending time of the transaction process and calculates a difference between both to automatically measure the response time of the transaction process.

The logging control unit 238 has a function to determine whether or not the transaction process satisfies the policy application condition based on the response time monitored by the transaction process monitoring unit 236. When the transaction process satisfies the policy application condition, the logging control unit 238 has another function to allow the storage device 240 to record a log of more items than normal concerning the transaction process in accordance with the policy corresponding to that application condition.

The storage device 240 records a log of transaction processes performed by the application programs 222 through 226. The storage device 240 includes a high-speed buffer 242 as a high-order storage and a long-term storage 244 as a low-order storage. The high-speed buffer 242 can be implemented, for example, from a computer system's main storage capable of relatively fast reading and writing. The high-speed buffer 242 records a full set of logs for each transaction process for a relatively short period of time.

On the other hand, the long-term storage 244 can be implemented from a hard disk device (HDD) that is slower than the main storage but is available at a low unit price per bit. The long-term storage 244 records all or part (sub-set) of the full set of transaction process logs recorded in the high-speed buffer 242 for a long period of time in accordance with a logging policy to be applied to the targeted transaction process. The long-term storage 244 does not record the full set of logs concerning all the transaction processes. It should be noted that a necessary storage capacity is reduced from the long-term storage 244 to be prepared.

FIGS. 5 and 6 exemplify a full set 500 of logs for the transaction process according to an embodiment of the invention. It is assumed that the application program 222 including components 1 through 4 performed the transaction process. The full set 500 of transaction process logs contains log/trace information 510 (see FIG. 5) about the transaction process and memory dump information 570 (see FIG. 6).

As shown in FIG. 5, the log/trace information 510 concerns the entire transaction process according to the embodiment of the invention and contains log/trace information 520, 530, 540, and 550, and response time 560. The log/trace information 520 concerns a process performed by the component 1. The log/trace information 530 concerns a process performed by the component 2. The log/trace information 540 concerns a process performed by the component 3. The log/trace information 550 concerns a process performed by the component 4. The response time 560 indicates the total processed time for the entire transaction process.

The log/trace information 520 about the process performed by the component 1 contains: starting time 522 of the process performed by the component 1; debug information about the process performed by the component 1; ending time 526 of the process performed by the component 1; and process time 528 of the process performed by the component 1. It should be noted that the equivalent information is contained in the log/trace information 530, 540, and 550 about the processes performed by the other components 2.

The log/trace information 510 in FIG. 5 contains reference information (a line beginning with "INFO"), warning information (a line beginning with "WARN"), and debug information (a line beginning with "DEBUG"). However, note that the "INFO" level outputs only the reference information, the "WARN" level outputs the reference information and the warning information, and the "DEBUG" level outputs all of the reference information, the warning information, and the debug information.

As shown in FIG. 6, the memory dump information 570 according to an embodiment of the invention contains: instance information 580 about the component used for the transaction process; control information 585; error information 587; detailed output data 590; and detailed input data 595. According to an embodiment of the invention, the instance information 580 contains an SQL statement 582 used. The control information 585 contains a transaction ID, a thread ID, and a user ID. The transaction ID is an identifier for indicating the type of the executed application program. The thread ID is an identifier for indicating the thread that actually executed the application program. The user ID indicates a user who requested the transaction process.

Returning now back to the description of FIG. 2, the log analysis unit 250 accesses a log recorded in the long-term storage 244. For example, the log analysis unit 250 extracts information needed for analysis of the transaction process system 150 to analyze a system error. According to an embodiment of the invention, the log analysis unit 250 can take into account the logging policy applied to each transaction process, identifies the transaction process to which a specific logging policy is applied, and extracts only the log about this transaction process as the information needed for the analysis. To provide the user 110 with the information needed for the log analysis, the log analysis unit 250 can transmit the extracted information to the client 120 via the network 130.

Figure 7:
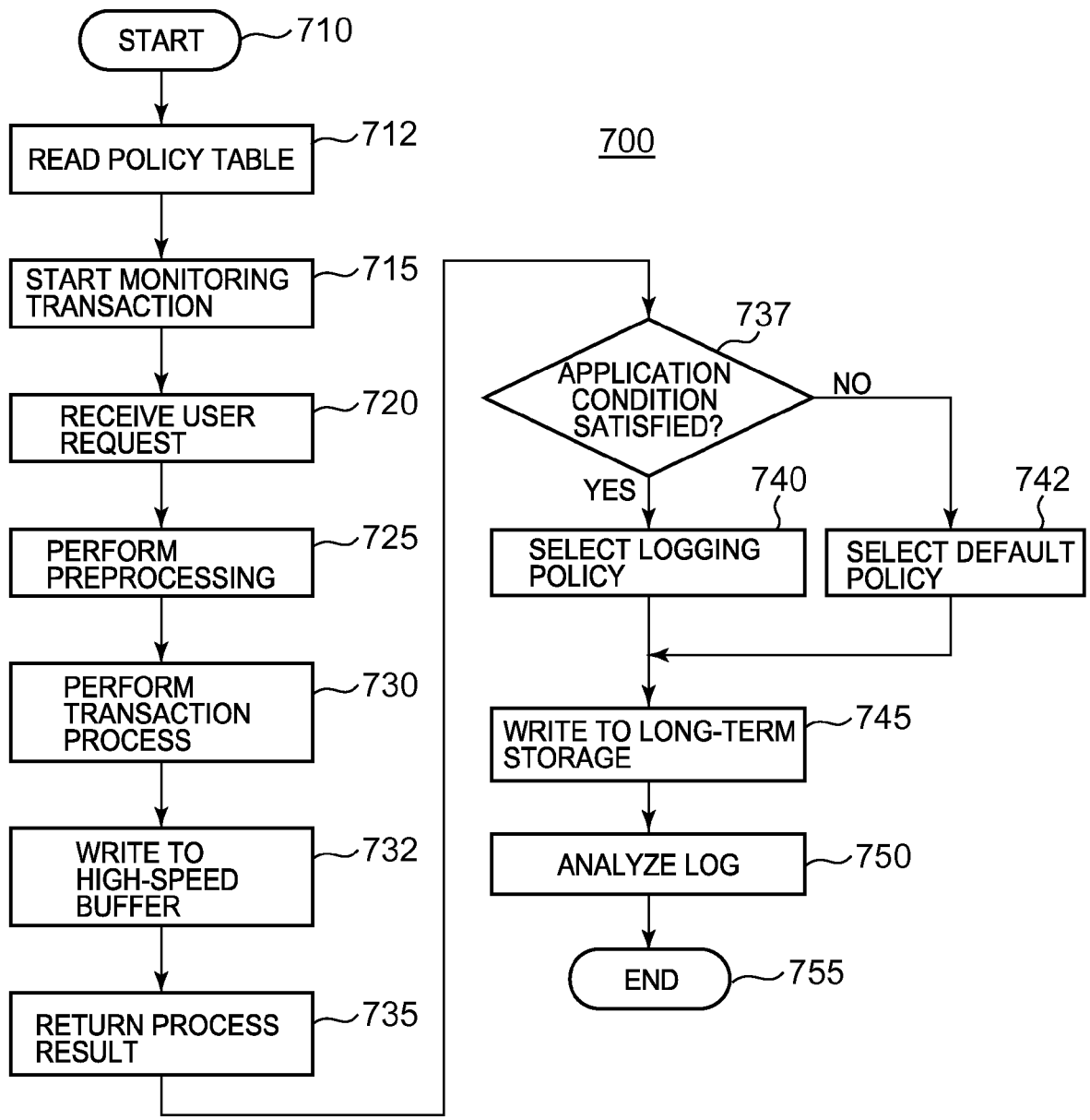
FIG. 7 is a flowchart showing a flow of operations of an active transaction process system according to an embodiment of the invention.

FIG. 7 is a flowchart 700 showing operations of the active transaction process system 150. The process starts at Step 710. At Step 712, the process starts managing the logging policy table 232 stored in the system. At Step 715, the transaction process monitoring unit 236 of the application server 160 starts monitoring the transaction process response time and the like in response to a service provider's instruction to start monitoring.

The process proceeds to Step 720. The communication interface 210 of the application server 160 receives a request for the transaction process from the client operated by the user 110 via the network 130. Upon reception of the request, the process proceeds to Step 725 to perform preprocessing for the transaction such as scheduling of each transaction process.

The process proceeds to Step 730. The application programs 222 through 226 on the application server 160 perform each of the preprocessed transaction processes. At Step 732, the high-speed buffer 242 as the high-order storage records a full set of logs for the transaction process as the transaction executing proceeds. When the transaction process is complete, the result of the transaction process is returned to the client 120 via the network 130 at Step 735.

The process further proceeds. At Step 737, the logging control unit 238 of the application server 160 determines whether or not the transaction process satisfies any of the policy application conditions stored in the logging policy table 232. For this process, the logging control unit 238 uses the logging policy table 232 and the transaction table 234 based on the transaction's response time measured by the transaction process monitoring unit 236.

When the transaction process satisfies any of the policy application conditions (Yes at Step 737), the process proceeds to Step 740. The logging control unit 238 selects the logging policy corresponding to the policy application condition. When the transaction process satisfies none of the policy application conditions defined in the logging policy table 232, the process proceeds to Step 742. The logging control unit 238 selects the default logging policy specified at initiation of the application program that performs the transaction process.

The process proceeds to Step 745. According to the logging policy selected at Step 740, all or part of the full set of this transaction log recorded in the high-speed buffer 242 is recorded in the long-term storage 244 as a low-order storage.

The process further proceeds. At Step 750, the log analysis unit 250 analyzes the log recorded in the log analysis unit 250. The log analysis is available in various methods. When the selected logging policy is applied to the log, for example, the log analysis unit 250 can extract only part of that log according to a specified rule and supply the extracted log to a service provider's administrator. In this manner, the administrator can easily analyze the problem using an editor or visually locate the primary cause. The log analysis unit 250 can be configured to supply a user with only part of the extracted log, not all the recorded logs. The process proceeds to Step 755 and then terminates.

Figure 8:
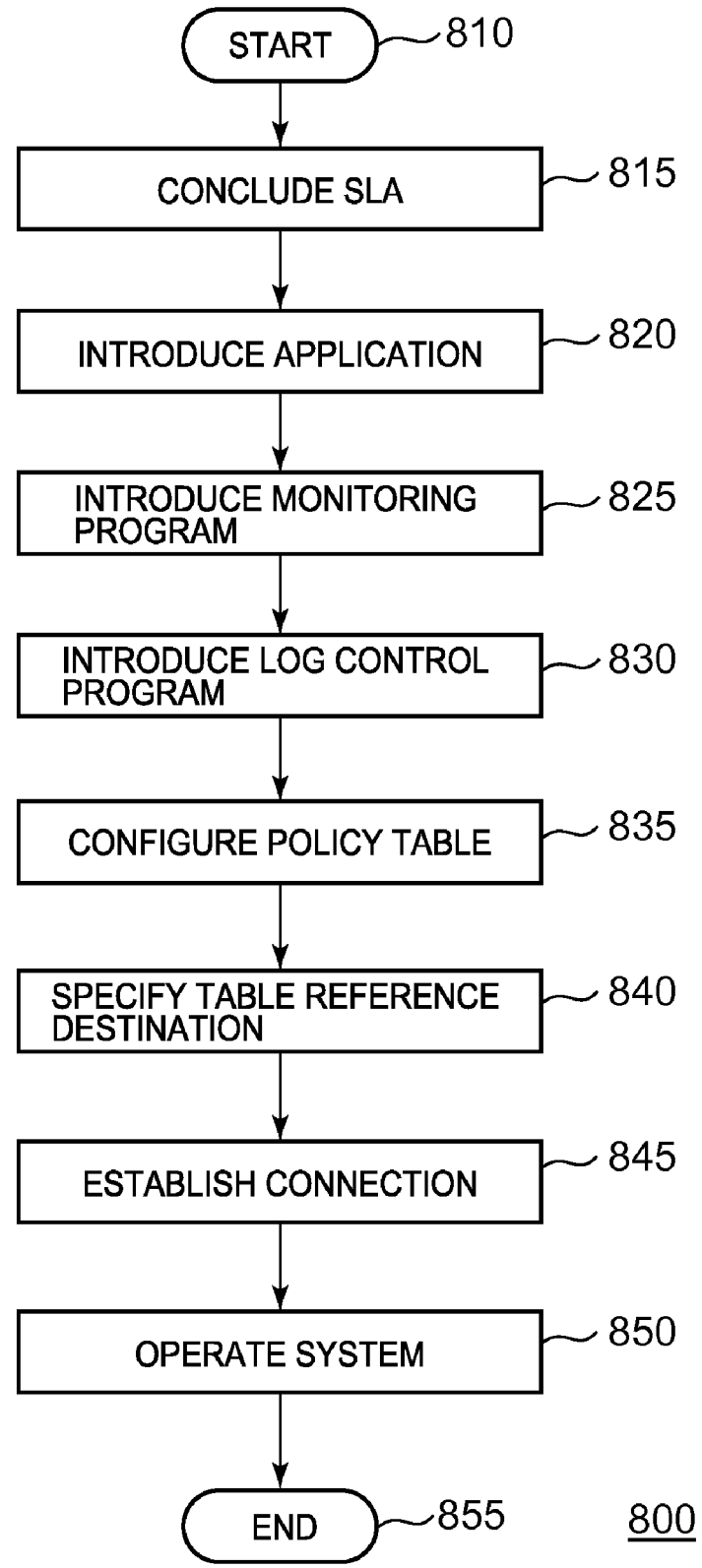
FIG. 8 is a flowchart showing a method of implementing the transaction process system according to an embodiment of the invention.

FIG. 8 is a flowchart 800 showing process steps of a method for implementing the transaction process system 150. The process starts from Step 810. At Step 815, the user 110 concludes the service level agreement 180 with the service provider 140. At Step 820, the service provider 140 develops and introduces the application programs 222 through 226 needed for an outsourcing service. At Step 825, a transaction process monitoring program is installed into the system to form the transaction process monitoring unit 236. At Step 830, a logging control program is installed into the system to form the logging control unit 238. Both programs can be installed by a so-called installer, i.e., a program for program installation.

At Step 835, the service provider 140 configures the logging policy table 232 and/or the transaction table 234 based on the service level agreement 180 concluded at Step 815. The process proceeds to Step 840. The service provider 140 specifies and configures a transaction policy table to be referenced by the logging control unit 238 formed at Step 830. The process proceeds to Step 845. A connection is made between the transaction process monitoring unit 236 and the logging control unit 238 so that the logging control unit 238 can acquire the response time for each transaction process. At Step 850, the service provider 140 operates the transaction process system 150. The process terminates at Step 855.

Figure 9:
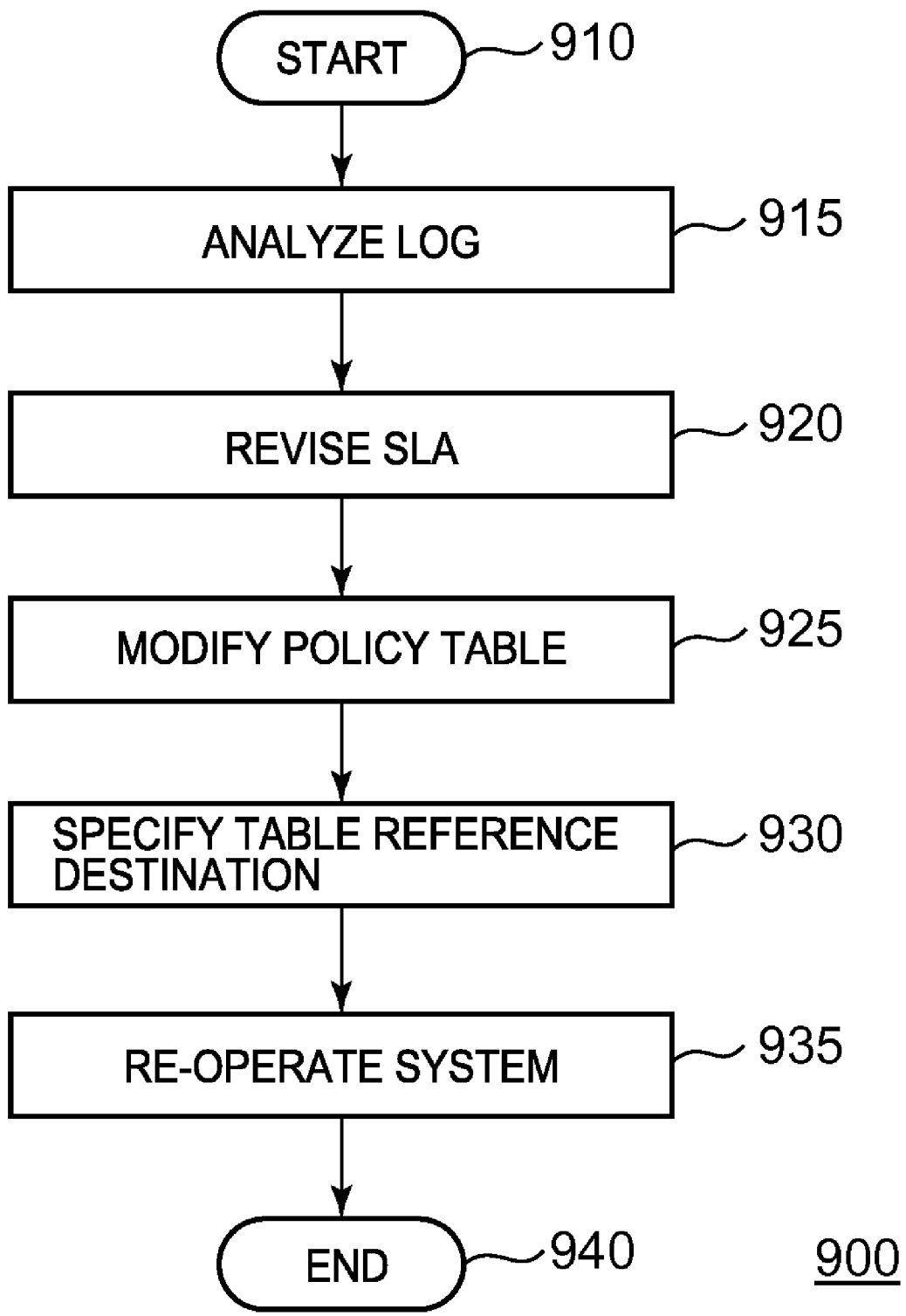
FIG. 9 is a flowchart showing a method of re-implementing the transaction process system when a service level agreement according to an embodiment of the invention is revised.

FIG. 9 is a flowchart 900 showing a method of re-implementing the transaction process system 150 when the service level agreement 180 according to the embodiment of the invention is revised. The process starts from Step 910. At Step 915, the user 110 and the service provider 140 analyze a recorded log using the logging policy table 232 and/or the transaction table 234 created based on the pre-revised service level agreement provided for the system. At Step 920, the service level agreement 180 is revised based on the knowledge obtained from the result of the log analysis at Step 915.

At Step 925, the logging policy table 232 and/or the transaction table 234 is modified so as to change the policy application condition and the logging policy based on the revised service level agreement 180. The process proceeds to Step 930. The system is configured so that the logging control unit 238 references the modified logging policy table 232 and/or transaction table 234. At Step 935, the transaction process system 150 restarts. At Step 940, the process terminates.

After the transaction process system 150 is re-implemented in accordance with the flowchart 900, the process according to the flowchart 700 is performed. In this case, the transaction process system 150 uses the logging policy table 232 and/or the transaction table 234 after the modification to record a log appropriate for the revised service level agreement 180. The user 110 and the service provider 140 can use the recorded log.

FIG. 10 exemplifies a hardware implementation of an information processing apparatus 1000 appropriate for implementing the client 120, the application server 160, and the database server 160 according to an embodiment of the invention. The information processing apparatus includes the central processing unit (CPU) 1 and the main memory 4. The CPU 1 and the main memory 4 are connected to the hard disk device 13 as an auxiliary storage via the bus 2. Removable storages such as a flexible disk device 20, an MO device 28, and CD-ROM devices 26 and 29 are connected to the bus 2 correspondingly via flexible disk controller 19, an IDE controller 25, and an SCSI controller 27. The removable storage is an external storage system whose recording medium is replaceable.

Storage media such as a flexible disk, MO, and CD-ROM are mounted on the removable storages such as the flexible disk device 20, the MO device 28, and CD-ROM devices 26 and 29, respectively. These storage media can record a computer program code that supplies an instruction to the CPU and the like in cooperation with the operating system for embodying the invention. The computer program is loaded into the main memory 4 for execution. The computer program can be compressed or divided into multiple portions to be recorded on multiple media.

The information processing apparatus 1000 can be further provided with user interface hardware including a pointing device 7 such as a mouse, a keyboard 6, and a display 12 for presenting visual data to a user. The information processing apparatus 1000 can connect with a printer (not shown) via a parallel port 16 or a modem (not shown) via a serial port 15. A server 300 can connect with the network via the serial port 15 and the modem or via a communication adapter 18 (Ethernet® card or TokenRing card) for communication with the other computers and the like.

A speaker 23 receives an audio signal that is D/A-converted (digital-analog converted) by an audio controller 21. The audio controller 21 A/D-converts (analog-digital converts) audio information received from a microphone 24 and enables the system to incorporate audio information outside the system.

According to the above-mentioned description, it will be easily understood that the information processing apparatus according to an embodiment of the invention can be implemented by an information processing apparatus such as a mainframe, workstation, ordinary personal computer (PC), or any combination of these. However, these components are examples. All the components are not required for the invention.

A person skilled in the art can easily suppose various modifications such as embodying the hardware components of the information processing apparatus used for the embodiment of the invention by combining multiple machines and distributing the functions to these machines. The modifications are duly attributed to the concept included in the spirit of the invention.

The client 120, the application server 160, and the database server 170 according to an embodiment of the invention can use an operating system that supports the GUI multi-window environment. Such operating system is available as the Windows® operating system provided by Microsoft Corporation, AIX provided by International Business Machines Corporation, Mac OS provided by Apple Computer Incorporated, or Linux®.

The client 120, the application server 160, and the database server 170 can uses a character-based operating system such as PC-DOS provided by International Business Machines Corporation and MS-DOS provided by Microsoft Corporation. Further, the client computer 110, the application server 160, and the database server 170 according to the embodiment of the invention can use a realtime OS such as OS/Open provided by International Business Machines Corporation, Vx Works provided by Wind River Systems, Inc., and a computer's built-in operating system such as Java® OS.

According to the above-mentioned description, it can be understood that the client 120, the application server 160, and the database server 170 are not limited to a specific operating system environment. Obviously, the client 120, the application server 160, and the database server 170 may operate on different operating systems.

While there has been described the embodiment of the invention, the technological scope of the invention is not limited to the scope of the above-mentioned embodiment. It is obvious for a person skilled in the art that various changes or improvements may be made in the above-mentioned embodiments. Accordingly, a form provided with such various changes or improvements is duly included in the technological scope of the invention.

The invention claimed is:

1. A system for performing logging of a transaction process performed based on a service level agreement concerning a response time of a transaction process, the system comprising:
   at least one computing device including:
   a logging policy table for recording at least one logging policy, the at least one logging policy defined so as to perform logging of a transaction process with a varying amount of log data, wherein the amount of log data recorded is determined based on a required response time specified in the service level agreement compared to the response time of the transaction process;
   a transaction process monitoring unit for automatically monitoring the response time of the transaction process;
   a storage device for recording a transaction process log; and
   a logging control unit for selecting one of the logging policies stored in the logging policy table based on the response time of the transaction process monitored by the transaction process monitoring unit and allowing the storage device to record a log of the transaction process in accordance with the selected logging policy.

2. The system according to claim 1,
   wherein the storage device includes a high-order storage and a low-order storage; and
   wherein the logging control unit allows the low-order storage to record all or part of the log of the transaction process recorded in the high-order storage, according to the logging policy.

3. The system according to claim 1,
wherein the logging policy table records a logging policy for performing, if the response time of the transaction process is longer than the required response time, logging of a larger amount of data than that for a case where the response time of the transaction process is shorter than the required response time.

4. The system according to claim 1, further comprising:
a log analysis unit for extracting information needed for analyzing the system to perform a transaction process, based on the log recorded in the storage device.

5. The system according to claim 4,
wherein the log analysis unit extracts information needed for the analysis in consideration of a logging policy applied to each transaction process.

6. The system according to claim 4,
wherein the log analysis unit transmits extracted information needed for the analysis to a user-operated client via a network.

7. The system according to claim 1,
wherein the logging policy table defines a condition for applying the logging policy by any or a combination of the response times of the transaction process, a type of an application to perform the transaction process, an ID of a client that requested the transaction process, and an ID of a client group containing a client that requested a transaction process.

8. The system according to claim 7,
wherein the logging policy table defines which data item on the transaction process, among data items including any or a combination of input data, output data, intermediate data, and error message for a transaction process, should be recorded as the logging policy.

9. The system according to claim 1, further comprising:
a transaction table defining a range of transaction to be logged,
wherein the logging control unit selects a logging policy to be applied by using the logging policy table for referring to the range of the transaction to be logged.

10. The system according to claim 7,
wherein the transaction table defines a range of transactions to be logged based on a parameter contained in a transaction process request.

11. The system according to claim 10,
wherein the parameter contained in the transaction process request contains any of a URI, a query string for a GET process, form data for a POST process, header information in a SOAP message, message data received by Message Driven Bean, and a message listener for receiving the message data.

12. The system according to claim 1,
wherein the log recorded in the storage device contains any or a combination of input data and output data for the transaction process, a database inquiry performed in the transaction process, an argument, a thread ID, and a transaction ID of a transaction process request, and the response time of the transaction process.

13. The system according to claim 1,
wherein the transaction process monitoring unit records a beginning time and an ending time of the transaction process and calculates a difference between the beginning time and the ending time to automatically measure a duration of the transaction process.

14. The system according to claim 1,
wherein the transaction process is performed based on a request from at least one client connected to a system for processing the transaction.

15. The system according to claim 1, further comprising at least one application program for performing a plurality of the transaction processes,
wherein at least one application program includes a plurality of component programs and at least part of the log is recorded in association with any of a plurality of the components.

16. A method for performing logging of a transaction process performed based on a service level agreement concerning a response time of a transaction process, comprising:
storing a logging policy table for recording at least one logging policy, the at least one logging policy defined so as to perform logging of a transaction process with a varying amount of log data, wherein the amount of log data recorded is determined based on a required response time specified in the service level agreement compared to the response time of the transaction process;
automatically monitoring the response time of the transaction process;
selecting one of the logging policies stored in the logging policy table, based on the response time of the transaction process monitored in the monitoring step; and
allowing the storage device to record a log of the transaction process in accordance with the selected logging policy.

17. The method according to claim 16 further comprising:
presenting the log recorded in the storage device for providing information about revision of the service level agreement;
changing the logging policy table based on a revised service level agreement; and
setting a reference destination of the logging policy table used in the selecting step at the selecting step.

18. A program product for performing logging of many transaction processes performed based on a service level agreement concerning a response time of a transaction process stored on a computer-readable storage medium, the program product comprising computer program code for causing a computer system to execute the steps of:
storing a logging policy table for recording at least one logging policy, the at least one logging policy defined so as to perform logging of a transaction process with a varying amount of log data, wherein the amount of log data recorded is determined based on a required response time specified in the service level agreement compared to the response time of the transaction process;
automatically monitoring the response time of the transaction process;
selecting one of the logging policies stored in the logging policy table based on the response time of the transaction process monitored in the monitoring step; and
allowing the storage device to record a log of the transaction process in accordance with the selected logging policy.

19. A method for implementing a system for performing logging of a transaction process performed based on a service level agreement concerning a response time of a transaction process, comprising:
installing a transaction process monitoring program that automatically monitors a response time of a transaction process on the system;
installing a logging control program that allows a storage device to record a log of the transaction process in accordance with a logging policy selected based on a transaction process response time on the system;

setting at least one logging policy defined so as to perform logging of a transaction process with a varying amount of log data, wherein the amount of log data recorded is determined based on a required response time specified in the service level agreement compared to the response time of the transaction process to a logging policy table;

setting a reference destination of a logging policy table used by the installed logging control program; and establishing connection between the installed transaction process monitoring program and the installed logging control program so as to receive a response time of each transaction process.

20. The method according to claim 19, further comprising:

presenting a log recorded in the storage device for providing information about revision of the service level agreement;

changing the logging policy table based on a revised service level agreement; and setting the reference destination of the changed logging policy table used by the logging control program to the logging policy table.

* * * * *